US012573914B2

(12) United States Patent
Uni

(10) Patent No.: US 12,573,914 B2
(45) Date of Patent: Mar. 10, 2026

(54) OUTER ROTOR TYPE MOTOR

(71) Applicant: SHINANO KENSHI KABUSHIKI KAISHA, Nagano (JP)

(72) Inventor: Masahiko Uni, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 191 days.

(21) Appl. No.: 18/416,422

(22) Filed: Jan. 18, 2024

(65) Prior Publication Data

US 2024/0250580 A1 Jul. 25, 2024

(30) Foreign Application Priority Data

Jan. 23, 2023 (JP) .................................. 2023-007740
Oct. 31, 2023 (JP) .................................. 2023-186376

(51) Int. Cl.
 *H02K 7/08* (2006.01)
 *H02K 5/16* (2006.01)
 *H02K 7/14* (2006.01)
(52) U.S. Cl.
 CPC .................................... *H02K 7/085* (2013.01)
(58) Field of Classification Search
 CPC ........ H02K 5/7085; H02K 5/187; H02K 7/14; H02K 5/16; H02K 5/167; H02K 5/24; H02K 7/08
 USPC ............................................. 310/67 R, 89, 90
 See application file for complete search history.

(56) References Cited

U.S. PATENT DOCUMENTS

2004/0256933 A1* 12/2004 Toyokawa ........... H02K 5/1675
                                                                    310/89

FOREIGN PATENT DOCUMENTS

| JP | H265714 | 5/1990 |
| JP | 2000-249140 | 9/2000 |
| JP | 2000249140 A * | 9/2000 |
| JP | 2002-122141 | 4/2002 |
| JP | 2005-20802 | 1/2005 |
| JP | 2009-85355 | 4/2009 |

OTHER PUBLICATIONS

Notice of Reasons for Refusal dated Nov. 26, 2024 in Japanese Application No. 2023-186376.

* cited by examiner

*Primary Examiner* — Jose A Gonzalez Quinones
(74) *Attorney, Agent, or Firm* — Stephen J. Weyer, Esq.; Stites & Harbison, PLLC

(57) ABSTRACT

In an outer rotor type motor (M) including a rotor (3) rotatably supported about a rotor shaft (3c) inserted into a sintered oil-retaining bearing (8), a sintered felt (9) made of a porous metal and supplying lubricating oil to the sintered oil-retaining bearing (8) is concentrically fitted to an outer periphery on one end side in an axial direction of the sintered oil-retaining bearing (8) and housed in a stator housing (6) in a range where the sintered felt (9) does not overlap with a stator core (7) assembled to an outer periphery of the stator housing (6) in a radial direction.

3 Claims, 5 Drawing Sheets

FIG.2

FIG.5A
FIG.5C
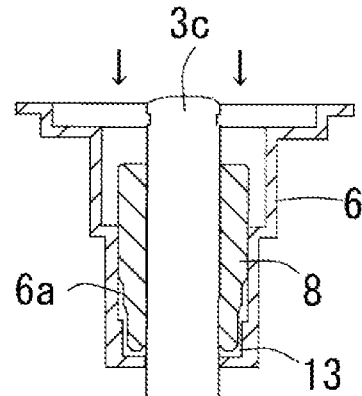
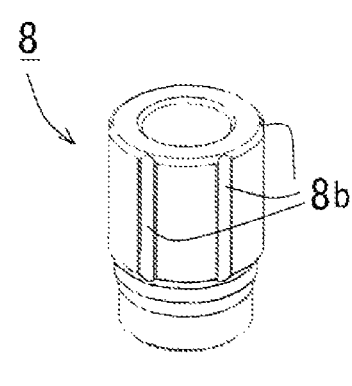
FIG.5B
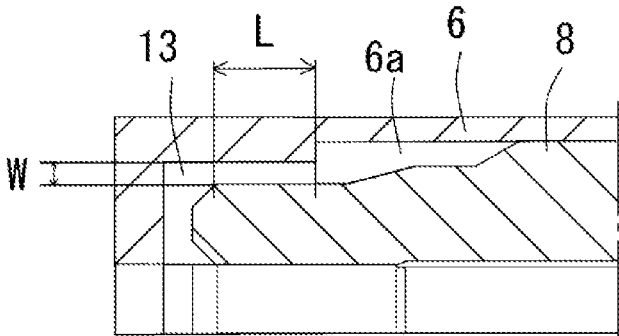

OUTER ROTOR TYPE MOTOR

CROSS-REFERENCE TO RELATED APPLICATION

This application is based upon and claims the benefit of priority of the prior Japanese Patent Applications Nos. 2023-007740, filed on Jan. 23, 2023 and 2023-186376, filed on Oct. 31, 2023 and the entire contents of which are incorporated herein by reference.

TECHNICAL FIELD

The present disclosure relates to an outer rotor type motor used as a drive source for, for example, a seat air conditioner, an HVAC (Heating, Ventilation, and Air Conditioning) system and the like.

BACKGROUND ART

As a bearing supporting the rotation of a rotor shaft, a sintered oil-retaining bearing which can reduce manufacturing costs as compared with a rolling bearing is used. A porous sintered metal material (for example, a material made by sintering an iron material and a copper material) in which a lubricating oil is impregnated thereinside is used for the sintered oil-retaining bearing.

If the lubricating oil impregnated thereinside is short when the sintered oil-retaining bearing is used, an oil film existing at a sliding portion between the rotor shaft and the bearing is lost, which may cause the seizure or may generate vibration or noise. When the amount of lubricating oil is tried to be increased, the sintered oil-retaining bearing may be increased in size and the leakage of lubricating oil may occur.

In order to increase the retaining amount of lubricating oil in the oil-retaining bearing and to prevent the lubricating oil from leaking and evaporating from the oil-retaining bearing, the following oil-retaining bearing mechanism is proposed. An inside bearing and an outside bearing having a substantially hollow and tubular shape and made of a porous material containing lubricating oil are concentrically provided, and a plurality of communicating grooves communicating with the outside and formed of part of an outer peripheral surface of the inside bearing and part of an inner peripheral surface of the outside bearing are formed between the outer peripheral surface of the inside bearing and the inner peripheral surface of the outside bearing, in which the communicating grooves make a space on one end side in an axial direction of the inside bearing and a space on the other side in the axial direction communicate with each other (refer to JP-2009-85355A: PTL 1).

SUMMARY OF INVENTION

Technical Problem

The oil-retaining bearing of PTL 1 is provided with the inside bearing and the outside bearing having the substantially hollow and tubular shape and made of the porous metal material containing the lubricating oil in the concentric manner; therefore, a dimension in a radial direction is increased when an oil content is tried to be increased. In addition, processing costs are increased for forming recessed portions at plural places along the axial direction on the inner peripheral surface of the outside bearing.

In response to the above, a felt metal in which a sintered oil-retaining bearing retaining lubricating oil (porous metal material: oil content 15 to 30 vol %) is used as the inside bearing, and a sintered oil-retaining bearing with an oil-supply mechanism (sintered felt: oil content 30 vol % or more) is concentrically arranged as the outside bearing is used.

The sintered oil-retaining bearing and the sintered felt are similar to each other in composition (a mixed material mainly formed of an iron material and a copper material); however, they are different in spatial density such that the sintered felt is sparser than the sintered oil-retaining bearing. Therefore, an ability of storing lubricating oil (a lubricating oil content per a unit volume) is higher in the sintered felt than in the sintered oil-retaining bearing.

However, the sintered felt is a hard spongy member which is plastically deformed as mechanical characteristics, though the sintered felt is made of a porous sintered metal similar to the sintered oil-retaining bearing; it is thus difficult to apply the stress like a common metal material.

That is, the sintered felt is press-fitted to an outer periphery of the sintered oil-retaining bearing (reference press-fit force: 20 to 50 N) and the sintered oil-retaining bearing is press-fitted to a stator housing through the sintered felt (reference press-fit force: 200 to 300 N), which are fixed to a motor base side. For example, when the sintered felt is press-fitted to a bearing outer diameter side and the outer diameter of the sintered felt is press-fitted to an inner diameter of the stator housing, there is a danger that a fixing force of the sintered oil-retaining bearing with respect to the stator housing is reduced.

Moreover, the lubricating oil inside the sintered oil-retaining bearing forms an oil film at a part close to the sliding portion between the rotor shaft and the bearing due to capillary action acting on a minute gap between the rotor shaft and the bearing, and pump effect generated by rotation of the rotor shaft. Furthermore, an expansion coefficient of the lubricating oil is higher than that of the sintered oil-retaining bearing. Accordingly, the lubrication oil contracts more than the bearing when the temperature is decreased to, for example, $-30°$ C.; therefore, the lubricating oil existing at the sliding portion may be short and the oil film to be formed between the rotor shaft and the sintered oil-retaining bearing may be lost, which may generate noise.

Solution to Problem

The present invention has been accomplished under the above circumstances, and an object thereof is to provide a small-sized outer rotor type motor in which the absence of an oil film does not occur and the mechanical strength of a bearing is not lost even when an oil-supply member is used with a sintered oil-retaining bearing.

In order to achieve the above object, the present invention has the following configurations.

An outer rotor type motor including a stator in which a stator core is assembled to an outer periphery of a tubular stator housing and a sintered oil-retaining bearing made of a porous sintered metal is concentrically assembled to an inner periphery of the stator housing, and a rotor rotatably supported about a rotor shaft inserted into the sintered oil-retaining bearing, in which an annular oil-supply member made of a porous sintered metal and supplying lubricating oil to the sintered oil-retaining bearing is concentrically fitted to an outer periphery on one end side in an axial direction of the sintered oil-retaining bearing and housed in the stator housing in a range where the oil-supply member does not overlap with the stator core assembled to the outer periphery of the stator housing in a radial direction.

According to the above, when the rotor shaft rotates while sliding against the sintered oil-retaining bearing, lubricating oil in the sintered oil-retaining bearing made of the porous sintered metal moves to sliding portions with respect to the rotor shaft, and the lubricating oil moves from the oil-supply member made of the porous sintered metal to the sintered oil-retaining bearing, it is possible to prevent the absence of the oil film at the sliding portions between the rotor shaft and the sintered oil-retaining bearing. When the rotation of the rotor shaft is stopped, the lubricating oil at the sliding portions returns to the sintered oil-retaining bearing, and the lubricating oil in the sintered oil-retaining bearing returns to the oil-supply member. The oil-supply member thus functions as a buffer for lubricating oil in the sintered oil-retaining bearing.

Moreover, the oil-supply member is concentrically fitted to the outer periphery on one end side in the axial direction of the sintered oil-retaining bearing in a range where the oil-supply member does not overlap, in the radial direction, with the stator core assembled to the outer periphery of the stator housing; therefore, an outer diameter of the sintered oil-retaining bearing is not increased more than necessary. The oil-supply member is fitted to one end side in the axial direction of the sintered oil-retaining bearing so as to partially overlap; therefore, the sintered oil-retaining bearing is not increased in size in the axial direction. Since the stator housing and the sintered oil-retaining bearing exist alone on the inner peripheral side of the stator core; therefore, a central hole of the stator core can be small in diameter and the motor can be reduced in size. Furthermore, the oil-supply member is not deformed at the time of assembling the stator core to the stator housing; therefore, the mechanical strength is not impaired.

The other end side of the stator housing in the axial direction where the oil-supply member is not provided may be molded to be further smaller than an outer diameter of the stator housing to which the stator core is assembled, a space portion may be provided between an outer periphery of the sintered oil-retaining bearing and the inner periphery of the stator housing, and the space portion may be provided so that a width from 0.05 mm to 0.3 mm inclusive in the radial direction is set when a length in the axial direction is 1.5 mm or more, and a width from 0.05 mm to 0.2 mm inclusive in the radial direction is set when the length in the axial direction is 1.0 mm or more.

According to the above, the space portion between the inner peripheral surface of the stator housing and the outer peripheral surface of the sintered oil-retaining bearing can be used as a buffer space for lubricating oil on the other end side in the axial direction of the sintered oil-retaining bearing where the oil-supply member is not provided.

A size of a gap between an outer peripheral surface of the oil-supply member and an inner peripheral surface of the stator housing may be from 0.05 mm to 0.5 mm inclusive in the radial direction and 5.0 mm or more in the axial direction.

According to the above, the gap between the outer peripheral surface of the oil-supply member and the inner peripheral surface of the stator housing can be used as an additional buffer for lubricating oil while the rotor shaft is stopped; therefore, the lubricating oil can be sufficiently supplied even when the oil-supply member is reduced in size. It is also possible to avoid interference with the stator housing at the time of assembling the oil-supply member to the sintered oil-retaining bearing.

The other end side of the stator housing in the axial direction where the oil-supply member is not provided may be molded to be further smaller than an outer diameter of the stator housing to which the stator core is assembled, a space portion may be provided between an outer periphery of the sintered oil-retaining bearing and the inner periphery of the stator housing, the space portion may be provided so that a width from 0.05 mm to 0.3 mm inclusive in the radial direction is set when a length in the axial direction is 1.5 mm or more, and a width from 0.05 mm to 0.2 mm inclusive in the radial direction is set when the length in the axial direction is 1.0 mm or more, and a size of a gap between an outer peripheral surface of the oil-supply member and an inner peripheral surface of the stator housing may be from 0.05 mm to 0.5 mm inclusive in the radial direction and 5.0 mm or more in the axial direction.

According to the above, the gap between the outer peripheral surface of the oil-supply member and the inner peripheral surface of the stator housing can be used as an additional buffer for lubricating oil while the rotor shaft is stopped; therefore, the lubricating oil can be sufficiently supplied even when the oil-supply member is reduced in size. Additionally, the space portion between the inner peripheral surface of the stator housing and the outer peripheral surface of the sintered oil-retaining bearing can be used as a buffer space for lubricating oil on the other end side in the axial direction of the sintered oil-retaining bearing where the oil-supply member is not provided.

Advantageous Effects of Invention

It is possible to provide a small-sized outer rotor type motor having a sintered oil-retaining bearing in which the absence of an oil film does not occur and the mechanical strength of the bearing is not lost even when an oil-supply member is used.

BRIEF DESCRIPTION OF DRAWINGS

FIG. 2 is a partial cross-sectional view of a centrifugal fan and a motor of FIG. 1.

FIGS. 5A to 5C are experimental explanation views for checking a retaining state of lubricating oil in a gap between a sintered oil-retaining bearing and a stator housing.

DESCRIPTION OF EMBODIMENTS

First Embodiment

Hereinafter, an outer rotor type motor according to an embodiment of the present invention will be explained with reference to the attached drawings. First, a schematic configuration of the outer rotor type motor will be explained with reference to FIG. 1 to FIG. 3. In the embodiment, an outer rotor type motor used as a drive source of a centrifugal blower will be explained as an example.

Figure 1:
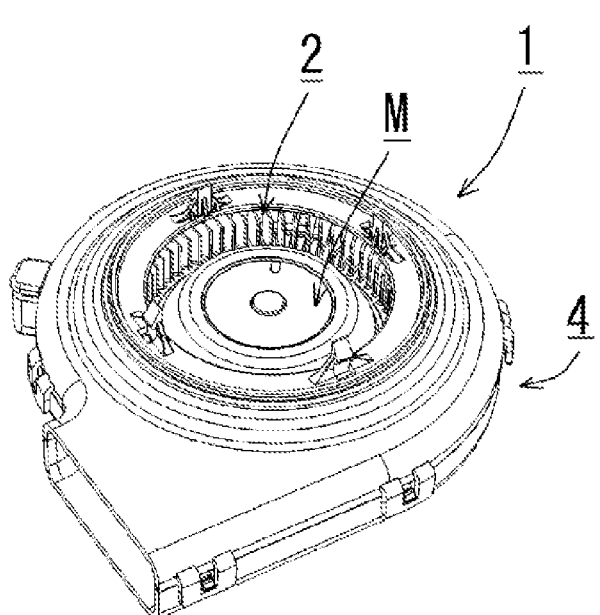
FIG. 1 is a perspective view of a centrifugal blower.

As shown in FIG. 1, in a centrifugal blower 1, a centrifugal fan 2 and a rotor 3 (see FIG. 2) are integrally assembled, and an outer rotor type motor M driving the above to rotate is housed inside a case body 4. Compressed air sucked from an upper part of the center in an axial direction of the case body 4 and centrifugally pressurized in the case body 4 is exhausted from an exhaust port provided on an outer periph-eral side surface of the case body 4.

The configuration of the outer rotor type motor M will be explained with reference to FIG. 2 and FIG. 3.

In the rotor 3, one end of a rotor shaft 3c is integrally assembled to a hub 3b of a rotor yoke 3a formed in a cup shape by any one of press-fitting, adhesion, shrink fitting, and the like, or by combination thereof. An annular rotor magnet 3d alternately magnetized to N-poles and S-poles is assembled to an inner peripheral surface of the rotor yoke 3a. The rotor yoke 3a may be insert-molded with the centrifugal fan 2.

In a stator 5, a stator core 7 is adhered to be fixed at an outer periphery of the center in the axial direction of a stator housing 6 formed in a tubular shape. The stator core 7 is assembled so that the stator housing 6 is inserted to a central hole of an annular core back portion 7a. The stator core 7 is assembled so as to abut on a stepped portion 6g provided in the stator housing 6 and to be positioned in the axial direction. In the stator core 7, a plurality of pole teeth 7b are provided to protrude from the core back portion 7a toward the outside in a radial direction. Peripheries of the pole teeth 7b are covered with insulators 7c, around which motor coils 7d are wound.

A sintered oil-retaining bearing 8 made of a porous sintered metal and formed in tubular shape is press-fitted into the stator housing 6. Lubricating oil is impregnated in the sintered oil-retaining bearing 8. A sintered felt 9 (oil-supply member) made of a porous metal for supplying lubricating oil to the sintered oil-retaining bearing is con-centrically fitted to an outer periphery of one end side (lower end side) in the axial direction of the sintered oil-retaining bearing 8 extended on an opposite side of the rotor yoke 3a so that the sintered felt 9 partially overlaps with the sintered oil-retaining bearing 8 in the axial direction. The sintered felt 9 is housed in a tubular hole of the stator housing 6 with a gap 10 from 0.05 mm to 0.5 mm inclusive provided between an outer peripheral surface of the sintered felt 9 and an inner peripheral surface of the stator housing 6.

According to the above, the gap 10 between the outer peripheral surface of the sintered felt 9 and the inner peripheral surface of the stator housing 6 can be used as an additional buffer for the lubricating oil while the rotor shaft 3c is stopped; therefore, the lubricating oil can be suffi-ciently supplied when the sintered felt 9 is reduced in size. It is also possible to avoid interference with the stator housing 6 at the time of assembling the sintered felt 9 having low mechanical strength to the sintered oil-retaining bearing 8.

The rotor shaft 3c is inserted into a tubular hole 6a of the stator housing 6 and is press-fitted into a tubular hole 8a of the sintered oil-retaining bearing 8 press-fitted into the stator housing 6. An insertion end portion of the rotor shaft 3c is supported so as to abut on a thrust bearing 6c supported by a closing member 6b that closes the tubular hole 6a of the stator housing 6. The closing member 6b abuts on and integrally assembled to a recessed portion 6d of the stator housing 6. Moreover, a retaining washer 6e is fitted to a part close to the insertion end portion of the rotor shaft 3c, which prevents the rotor shaft 3c from falling off in the axial direction. The closing member 6b is sealed by a sealant 6f to be filled in the recessed portion 6d of the stator housing 6.

The stator housing 6 is fixed to and integrally assembled to a sheet metal-shaped base plate 11 that covers a motor bottom portion. A motor substrate 12 is assembled on the base plate 11 in an overlapping manner so that the stator housing 6 is inserted into a substrate through hole 12a. An energizing circuit is formed in the motor substrate 12, and coil leads of the motor coils 7d are electrically connected to a terminal portion.

Figure 2:
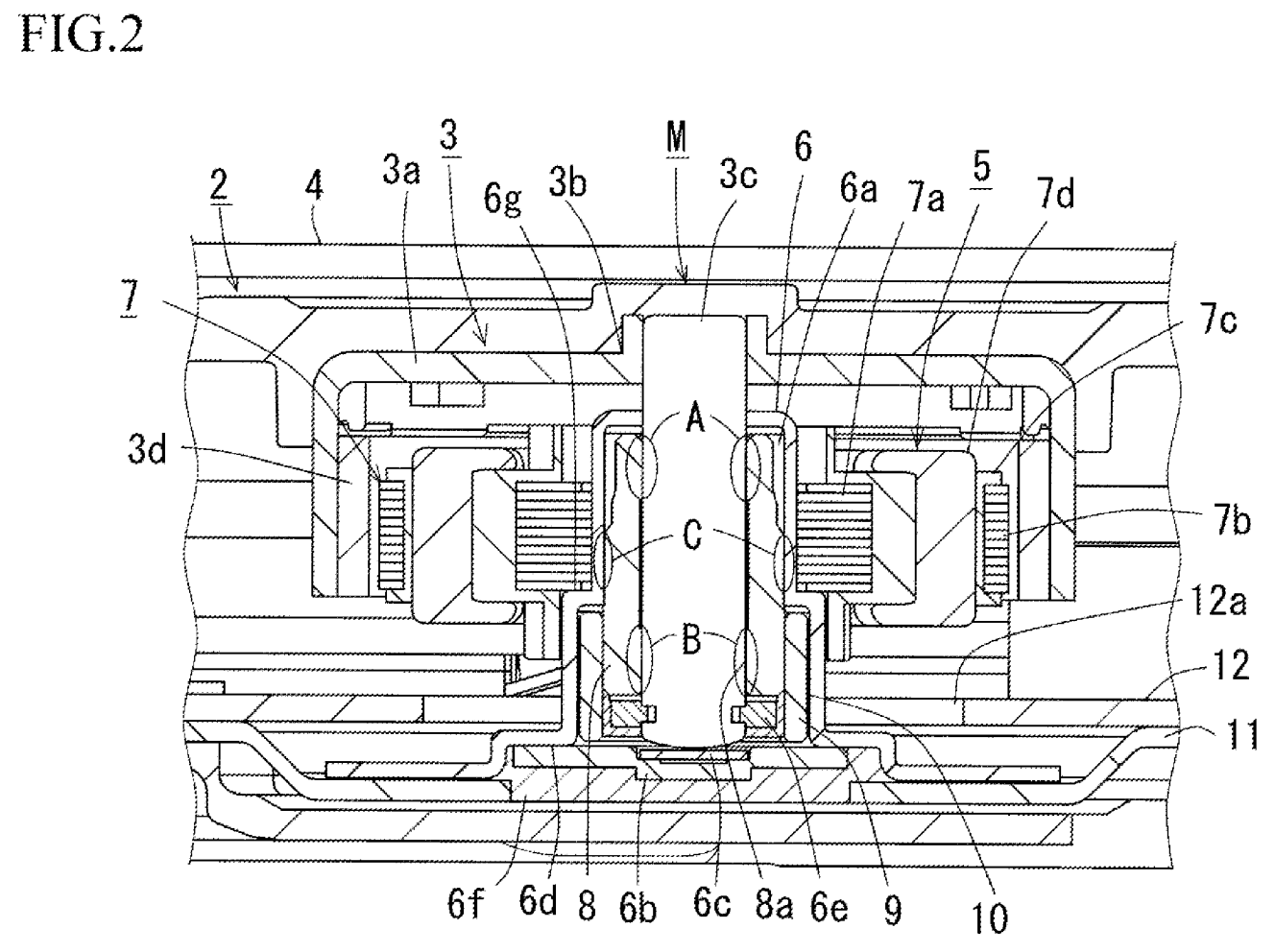

As shown in FIG. 2, the rotor shaft 3c and the sintered oil-retaining bearing 8 slide each other at places of both end portions in the axial direction of the sintered oil-retaining bearing 8 (an upper end portion denoted by oval A and a lower end portion denoted by oval B). Gaps are formed between the both end portions in the axial direction of the sintered oil-retaining bearing 8 and an inner wall of the stator housing 6. Furthermore, the sintered felt 9 is press-fitted to the outer periphery of the lower end portion in the axial direction in the sintered oil-retaining bearing 8. There-fore, when the rotor shaft 3c rotates while sliding against the sintered oil-retaining bearing 8, the lubricating oil in the sintered oil-retaining bearing 8 made of the porous sintered metal moves to sliding portions, and the lubricating oil moves from the sintered felt 9 made of the porous metal into the sintered oil-retaining bearing 8 so as to compensate for the moved lubricating oil. The absence of the oil film at the sliding portions between the rotor shaft 3c and the sintered oil-retaining bearing 8 can be prevented in the above man-ner. When the rotation of the rotor shaft 3c is stopped, the lubricating oil at the sliding portions returns to the sintered oil-retaining bearing 8, and the lubricating oil returns to the sintered felt 9 so as to receive the lubricating oil overflowing in the sintered oil-retaining bearing 8. The sintered felt 9 thus functions as a buffer for lubricating oil in the sintered oil-retaining bearing 8.

The sintered felt 9 is concentrically press-fitted so as to partially overlap on the lower end side in the axial direction of the sintered oil-retaining bearing 8. Accordingly, the stator core 7 is assembled to the outer periphery of the stator housing 6 directly overlapping with the sintered oil-retaining bearing 8 in the radial direction as shown by oval C of FIG. 2. That is, the sintered felt 9 is arranged at a position not affecting a dimension in the radial direction of the stator core 7 in a range where the sintered felt 9 does not overlap, in the radial direction, with the stator core 7 assembled to the outer periphery of the stator housing 6. Accordingly, the stator housing 6 and the sintered oil-retaining bearing 8 exist alone on the inner peripheral side of the stator core 7; therefore, the central hole of the stator core 7 can be small in diameter and the motor can be small in size. Moreover, the sintered felt 9 is not deformed when the stator core 7 is assembled to the stator housing 6, which does not impair the mechanical strength.

Additionally, the sintered felt 9 is housed with the gap 10 provided between the sintered felt 9 and the inner wall of the stator housing 6; therefore, the gap 10 can be used as the buffer for lubricating oil and the sintered felt 9 can be small in diameter.

Figure 3:
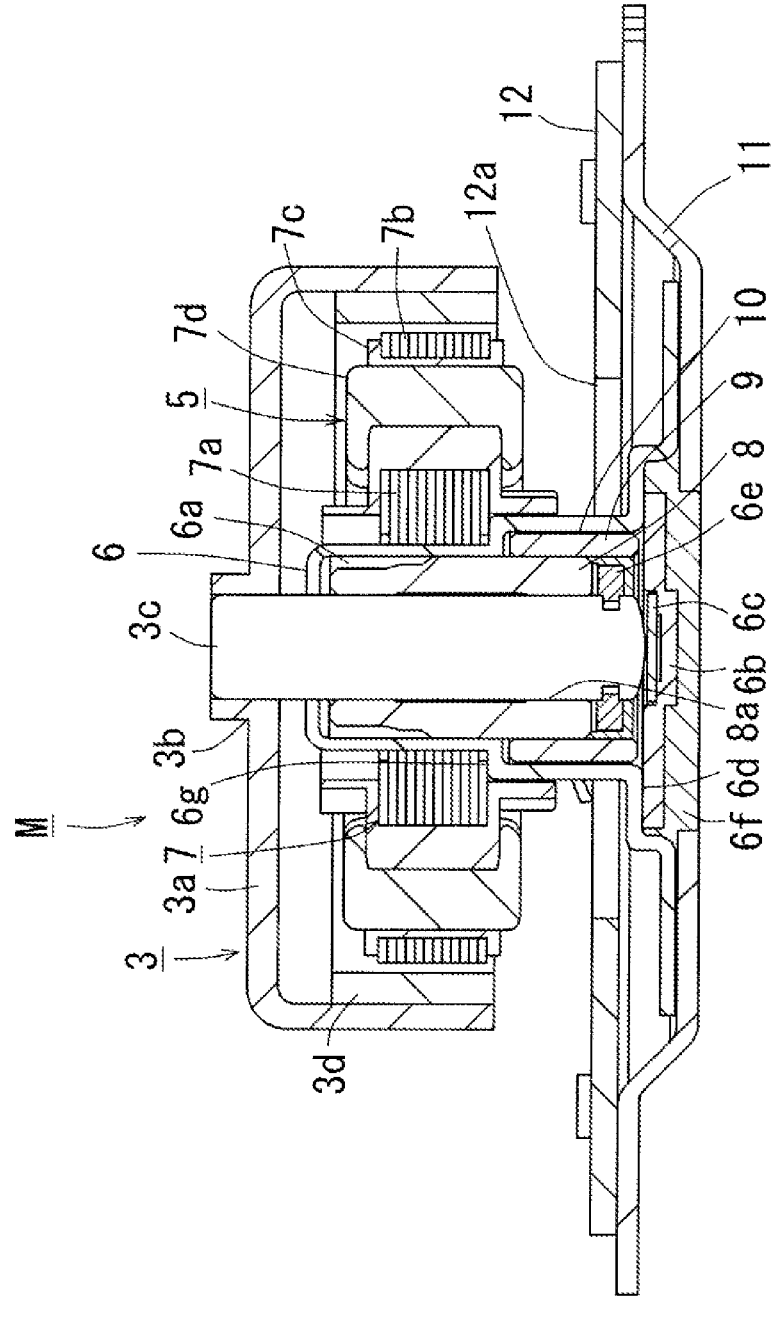
FIG. 3 is a vertical cross-sectional view of an outer rotor type motor according to a first embodiment.

When the above-described outer rotor type motor Mis assembled, the sintered oil-retaining bearing 8 is press-fitted and fixed to the tubular hole 6a of the stator housing 6 as shown in FIG. 3. Then, sizing processing for evening out an inner diameter of the tubular hole 8a of the sintered oil-retaining bearing 8 is performed.

Next, the sintered felt 9 is press-fitted to an outer periph-ery of one end side (lower end side) of the sintered oil-retaining bearing 8 in an overlapping manner. The sintered felt 9 is housed with the gap 10 being formed in the tubular hole 6a of the stator housing 6.

Next, resistance welding is performed in a state where a flange portion of the stator housing 6 overlaps with a bottom surface of the base plate 11 so as to be integrally assembled. Then, the motor substrate 12 is stacked over the base plate 11 and assembled thereto by swaging protrusions provided in the base plate 11 in a state where the stator housing 6 is inserted into the substrate through hole 12*a*.

The stator core 7 is adhered and fixed in a state where the stator housing 6 is inserted into the central hole of the core back portion 7*a*. The stator core 7 is assembled while being positioned in the axial direction by the stepped portion 6*g* of the stator housing 6. The coil leads drawn out from the motor coils 7*d* wound around the pole teeth 7*b* of the stator core 7 are electrically connected to the terminal portion of the motor substrate by soldering.

Next, the rotor shaft 3*c* of the rotor 3 integrally formed with the centrifugal fan 2 is inserted into the tubular hole 6*a* of the stator housing 6 and is press-fitted into the tubular hole 8*a* of the sintered oil-retaining bearing 8. The retaining washer 6*e* is assembled to the insertion end portion of the rotor shaft 3*c* exposed from the sintered oil-retaining bearing 8 to prevent fall-off. The thrust bearing 6*c* supported by the closing member 6*b* is stacked so as to abut on the end portion of the rotor shaft 3*c*, and the sealant 6*f* (a resin material such as an adhesive) is filled in the recessed portion 6*d* so as to cover and seal the closing member 6*b*.

According to the experiment, effects on the occurrence of noise in the sintered oil-retaining bearing 8 at the time of driving at low temperature are as follows. The outer rotor type motor M was driven for 30 minutes and stopped for 30 minutes repeatedly under an environment of 85° C. to thereby execute endurance tests for 1,000 hours in total.

In products to which the sintered felt 9 was not assembled, noise was not generated at −30° C. or more before the endurance tests and noise was not generated at 0° C. or more after the endurance tests.

Whereas in products to which the sintered felt 9 was assembled, noise was not generated at −40° C. or more before the endurance tests and noise was not generated at −30° C. or more after the endurance tests.

According to the above results, it was found that the durability of the outer rotor type motor M under the low-temperature environment was improved.

As described above, when the rotor shaft 3*c* rotates while sliding against the sintered oil-retaining bearing 8, the lubricating oil in the sintered oil-retaining bearing 8 made of the porous sintered metal moves to the sliding portions oval A, oval B shown in FIG. 2 and the lubricating oil moves from the sintered felt 9 made of the porous metal into the sintered oil-retaining bearing 8, thereby preventing the absence of the oil film at the sliding portions oval A, oval B between the rotor shaft 3*c* and the sintered oil-retaining bearing 8. When the rotation of the rotor shaft 3*c* is stopped, the lubricating oil at the sliding portions oval A, oval B returns to the sintered oil-retaining bearing 8, and the lubricating oil overflowing in the sintered oil-retaining bearing 8 returns to the sintered felt 9. The sintered felt 9 thus functions as the buffer for lubricating oil in the sintered oil-retaining bearing 8.

Moreover, the sintered felt 9 is concentrically fitted to the outer periphery on one side in the axial direction of the sintered oil-retaining bearing 8 so as to partially overlap with the sintered oil-retaining bearing 8; therefore, an outer diameter of the sintered oil-retaining bearing 8 is not increased more than necessary, and the sintered oil-retaining bearing 8 is not increased in size in the axial direction.

Furthermore, the sintered felt 9 is housed in the tubular hole 6*a* with the gap 10 provided between the sintered felt 9 and the inner wall of the stator housing 6; therefore, the gap 10 can be used as the buffer for lubricating oil without impairing the mechanical strength of the sintered oil-retaining bearing 8, and the sintered felt 9 can be small in diameter.

Second Embodiment

Figure 4:
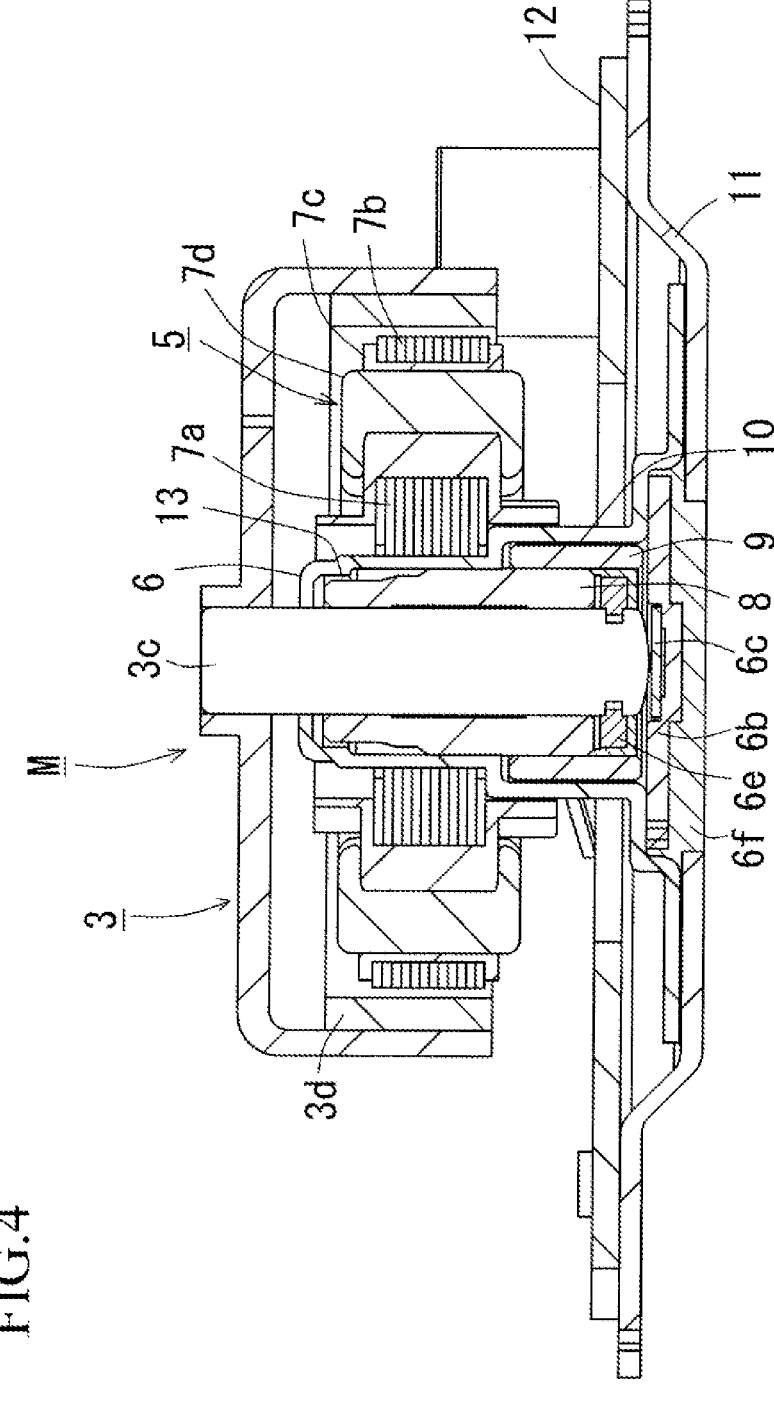
FIG. 4 is a vertical cross-sectional view of an outer rotor type motor according to a second embodiment.

Next, another example of the outer rotor type motor will be explained with reference to FIG. 4.

The same members as the first embodiment are denoted by the same reference signs and explanation is incorporated by reference, and different configurations will be mainly explained. An outer diameter of the stator housing 6 on the other end side (rotor 3 side) in the axial direction where the sintered felt 9 (oil-supply member) is not provided is molded to be further smaller in diameter than an outer diameter of a portion where the stator core 7 is assembled, and a space portion 13 is provided between the stator housing 6 and a portion close to a tip end of the sintered oil-retaining bearing 8. In the space portion 13, a gap at least from 0.05 mm to 0.3 mm inclusive is provided in the radial direction, and lubricating oil can be retained in the gap.

According to the above, the space portion 13 formed between the inner peripheral surface of the stator housing 6 and the sintered oil-retaining bearing 8 on the other end side in the axial direction where the sintered felt 9 is not provided in the axial direction of the sintered oil-retaining bearing 8 can be used as a buffer space for lubricating oil.

In order to secure the robustness for ambient temperature or the like and to exhibit the performance of the sintered oil-retaining bearing 8 stably for a long time, it is desirable that redundant lubricating oil exists around the sintered oil-retaining bearing 8 and the sintered felt 9 (oil-supply member), and it is necessary to prevent the redundant lubricating oil from leaking.

In the present invention, the "gap 10 between the sintered felt 9 and the stator housing 6" and the "space portion 13 between the sintered oil-retaining bearing 8 and the stator housing 6" have the function of retaining the redundant lubricating oil as described above.

An experiment for confirming whether the lubricating oil can be retained was carried out while regarding the "gap 10 between the sintered felt 9 (oil-supply member) and the stator housing 6" and the "space portion 13 between the sintered oil-retaining bearing 8 and the stator housing 6" as gaps.

First, the gap for retaining the lubricating oil is defined by a "gap width W" which is a separation distance between the sintered oil-retaining bearing 8 and the stator housing 6 and a "gap length L" which is a distance of a gap in a cylindrical longitudinal direction of the sintered oil-retaining bearing 8 as shown in FIGS. 5A and 5B. The case of using the oil-supply member will be described later. Numerical values of a plurality of gap widths W and a plurality of gap lengths L were selected, and a plurality of experimental members having the approximately identical shape to the stator housing 6 having inside dimensions corresponding to these numerical values were formed. As the experimental members, a transparent resin was adopted to thereby make a retaining state of lubricating oil easy to be observed.

The sintered oil-retaining bearing 8 was fitted to these plural experimental members, the lubricating oil used for the sintered oil-retaining bearing 8 was dropped, and real abilities of whether the lubricating oil can be retained in the gap between the sintered oil-retaining bearing 8 and the stator housing 6 or not were verified.

Table 1 shown below indicates variation in kinematic viscosity of lubricating oil used in the drop experiment with respect to temperature variation.

TABLE 1

| Temperature (° C.) | Kinematic viscosity(cSt) |
| --- | --- |
| −40 | 1850 |
| 40 | 28 |
| 80 | 9.4 |
| 100 | 7.7 |
| 120 | 6 |

When the side where the space portion 13 exists in a cylindrical longitudinal direction of the sintered oil-retaining bearing 8 is regarded as the tip end in the experimental member, the tip end side was set in the bottom side, the lubricating oil was dropped from a rear end (an upper side in FIG. 5A) of the sintered oil-retaining bearing 8 (see an arrow in FIG. 5A), and whether the lubricating oil leaked out to the end (lower side) of the gap (space portion 13) or not was checked. A drop amount of the lubricating oil was 50 μL which is a standard amount to be used in the sintered oil-retaining bearing 8. As experiment environment, room temperature (20° C.) and 80° C. were set.

In the experiment, verification was carried out in a state where the rotor shaft $3c$ was inserted into the sintered oil-retaining bearing 8 so as to prevent the lubricating oil from leaking through an inner peripheral side of the sintered oil-retaining bearing 8 (see FIG. 5A).

Moreover, as shown in FIG. 5C, a plurality of grooves $8b$ for bleeding air are provided on the outer peripheral surface of the sintered oil-retaining bearing 8; therefore, the dropped lubricating oil goes down to the gap (space portion 13) immediately.

Table 2 and Table 3 shown below indicate results of the drop experiments in a case where the gap width W and the gap length L were changed. Cases where leakage to a lower part of the gap does not occur (cases where the lubricating oil is retained in the gap) are written as "OK" because such state is desirable, and cases where the leakage to the lower part occurs are written as "NG" because such state is not desirable.

TABLE 2

| | Just after dropping at room temperature (20° C.) | | |
| --- | --- | --- | --- |
| | | Gap length L | |
| Gap width W | 1.5 (mm) | 1.0 (mm) | 0.5 (mm) |
| 0.4 (mm) | OK | OK | OK |
| 0.3 (mm) | OK | OK | OK |
| 0.2 (mm) | OK | OK | OK |

TABLE 3

| | Left for one hour at 80° C. | | |
| --- | --- | --- | --- |
| | | Gap length L | |
| Gap width W | 1.5 (mm) | 1.0 (mm) | 0.5 (mm) |
| 0.4 (mm) | NG | NG | NG |
| 0.3 (mm) | OK | NG | NG |
| 0.2 (mm) | OK | OK | NG |

According to the above experimental results, it was found that the leakage of lubricating oil does not occur when the gap length L is 1.5 mm or more and the gap width W is 0.3 mm or less, and that the leakage of lubricating oil does not occur when the gap length L is 1.0 mm or more and the gap width W is 0.2 mm or less. It was confirmed that the gap can be effectively functioned as the buffer (retaining space) for lubricating oil.

Moreover, it can be seen that the gap has the ability of retaining lubricating oil when the gap length L and the gap width W has a relationship of "gap width W≤ (⅕) gap length L" on the basis of experimental results.

When the gap in the experiment is applied to the space portion 13 between the outer periphery of the sintered oil-retaining bearing 8 and the inner periphery of the stator housing 6, the gap will be "0.05 mm to 0.3 mm inclusive in the radial direction, 1.5 mm or more in the axial direction" or "0.05 mm to 0.2 mm inclusive in the radial direction, 1.0 mm or more in the axial direction". Note that the minimum value 0.05 mm as the gap width in the radial direction is a tolerance based on processing accuracy of parts.

In the present invention, 5.0 mm is adopted as the length in the axial direction of the oil-supply member (sintered felt; see FIG. 3). Since the oil-retaining ability differs in the sintered oil-retaining bearing 8 and the oil-supply member, the length is multiplied by 2.0 as a safety factor. Accordingly, the size of the gap 10 between the outer peripheral surface of the oil-supply member and the inner peripheral surface of the stator housing 6, when being applied to the size of the gap of the experiment, will be "0.05 mm to 0.5 mm inclusive in the radial direction, 5.0 mm or more in the axial direction" according to the above relationship of "gap width W≤(⅕) gap length L". Note that the minimum value 0.05 mm as the gap width in the radial direction is a tolerance based on processing accuracy of parts.

The gap width W is set to "0.5 mm or less", not "1.0 mm or less" by being multiplied by 2.0 because the oil-retaining ability differs in the sintered oil-retaining bearing 8 and the oil-supply member as described above. When the length of the oil-supply member in the axial direction is set to values other than 5.0 mm, a gap width W that satisfies a relationship of "gap width W≤(⅕) gap length L×(1/safety factor)" can be selected.

The embodiments of the outer rotor type motor have been explained by citing an in-vehicle seat air conditioner as an example; however, the embodiments can be applied to a centrifugal blower for HVAC (Heating, Ventilation, and Air Conditioning) or the like. It goes without saying that the present invention has the same advantages even in a site other than a vehicle, where an extra space is small and a space for arranging a related-art air conditioning blower is difficult to be secured.

What is claimed is:

1. An outer rotor type motor comprising:
a stator in which a stator core is assembled to an outer periphery of a tubular stator housing, and a sintered oil-retaining bearing made of a porous sintered metal is concentrically assembled to an inner periphery of the stator housing; and
a rotor rotatably supported about a rotor shaft inserted into the sintered oil-retaining bearing,
wherein an annular oil-supply member made of a porous sintered metal and supplying lubricating oil to the sintered oil-retaining bearing is concentrically fitted to an outer periphery on one end side in an axial direction of the sintered oil-retaining bearing and housed in the stator housing in a range where the oil-supply member does not overlap with the stator core assembled to the outer periphery of the stator housing in a radial direction and a size of a gap between an outer peripheral surface of the oil-supply member and an inner peripheral surface of the stator housing is from 0.05 mm to 0.5 mm inclusive in the radial direction and 5.0 mm or more in the axial direction.

2. The outer rotor type motor according to claim 1, wherein the other end side of the stator housing in the axial direction where the oil-supply member is not provided is molded to be further smaller than an outer diameter of the stator housing to which the stator core is assembled, a space portion is provided between an outer periphery of the sintered oil-retaining bearing and the inner periphery of the stator housing, and the space portion is provided so that a width from 0.05 mm to 0.3 mm inclusive in the radial direction is set when a length in the axial direction is 1.5 mm or more, and a width from 0.05 mm to 0.2 mm inclusive in the radial direction is set when the length in the axial direction is 1.0 mm or more.

3. The outer rotor type motor according to claim 1, wherein the other end side of the stator housing in the axial direction where the oil-supply member is not provided is molded to be further smaller than an outer diameter of the stator housing to which the stator core is assembled, a space portion is provided between an outer periphery of the sintered oil-retaining bearing and the inner periphery of the stator housing, and the space portion is provided so that a width from 0.05 mm to 0.3 mm inclusive in the radial direction is set when a length in the axial direction is 1.5 mm or more, and a width from 0.05 mm to 0.2 mm inclusive in the radial direction is set when the length in the axial direction is 1.0 mm or more.

* * * * *